United States Patent [19]

Hulber et al.

[11] 4,397,904

[45] Aug. 9, 1983

[54] HINGE FOR THERMOPLASTIC MATERIAL

[75] Inventors: Loren J. Hulber, Naperville; Raymond W. Fluckiger, Chicago, both of Ill.

[73] Assignee: Jostens, Inc., Minneapolis, Minn.

[21] Appl. No.: 253,245

[22] Filed: Apr. 13, 1981

[51] Int. Cl.$^3$ .................................... B32B 3/02

[52] U.S. Cl. .................................... 428/167; 150/52 R

[58] Field of Search .............. 229/16 R, 44 R, 44 EC, 229/DIG. 4; 428/167; 150/52 R

[56] References Cited

U.S. PATENT DOCUMENTS

T535,843 12/1968 Pardue et al. .................... 428/167

FOREIGN PATENT DOCUMENTS 970747 1/1951 France .................... 229/16 R

OTHER PUBLICATIONS

1975–1976 Modern Plastics Encyclopedia Article by Kenneth Arutt entitled "High-Frequency Head-Sealing/Embossing".

*Primary Examiner*—William J. Van Balen

*Attorney, Agent, or Firm*—Laff, Whitesel, Conte & Saret

[57] ABSTRACT

A hinge for thermoplastic material particularly suitable for loose-leaf binder covers is constructed by embedding an embossed welding die into the thermoplastic material to a depth less than the full height of the embossment so that no vertical lines are produced in the themoplastic by the longitudinal edges of the die. The resulting surface of the thermoplastic is a hinge containing indentations corresponding to the pattern of the embossed die, which permit the thermoplastic to be folded at the hinge area.

2 Claims, 9 Drawing Figures

HINGE FOR THERMOPLASTIC MATERIAL

BACKGROUND OF THE INVENTION

This invention relates to loose-leaf binders and, more particularly, to a vinyl loose-leaf binder cover having an improved hinge and the process for making the same.

Loose-leaf binders, also sometimes referred to as notebooks, are commonly used in schools, home and businesses to store loose-leaf paper. Loose-leaf binders usually consist of a vinyl cover portion and a metal ring or clasp portion. Paper is retained by the rings or clasp within the cover.

The binder cover usually consists of front, back and side portions composed of sheets of vinyl stiffened by cardboard inserts. Usually, the juncture of the side with the front and back portions are hinges integrally formed out of the vinyl sheets. The vinyl sheets are welded between the cardboard inserts so that the hinge area is more narrow than the portions of the cover on either side of the hinge, thereby permitting the front and back to be folded relative to the side and rotated relative to the hinge.

Welding the vinyl causes components of the vinyl, notably plasticizer, to be removed. The reduction in thickness and in the amount of vinyl and plasticizer resulting during the welding process weakens the hinge area and tends to contribute to an eventual splitting or tearing of the vinyl resulting from normal use along the hinge, and particularly along the vertical boundary of the hinge with the side, front and back portions of the cover. This problem has been found to be compounded by the shape of the welding die used to create the hinge. Most commonly, the die is a flat strip of brass having a flat, squared-off welding surface. This shape of die creates a correspondingly flat, squared-off shaped hinge in the vinyl. The boundaries of the hinges with the other portions of the cover are vertical lines running from the top to the bottom of the binder cover, and that is where splitting generally occurs.

To combat this problem, some binder covers have hinges which are welded with lightly etched welding dies. The die is impressed into the vinyl to the full length of the etchings, and sometimes beyond, which creates a hinge having alternating horizontal ridges and indentations. While this type of die removes less vinyl from the hinge area than does the squared-off die, it still produces substantially continuous vertical boundaries with the adjacent portions of the cover, and splitting occurs frequently.

Accordingly, an object of this invention is to provide a loose-leaf binder cover having a new and improved hinge and a process for making the same. A more particular object is to provide a hinge for a loose-leaf binder cover which is stronger and more resistant to splitting and tearing.

In keeping with one aspect of the invention, a hinged loose leaf binder cover is constructed from three flat rigid inserts placed between a pair of sheets of thermoplastic material. The edges of these sheets are melted to seal them. An embossed die is applied along a length of the sheets between the inserts to a depth less than the full height of the embossment so that the longitudinal edges of the embossed surface of the die do not contact the sheets. The sheets are then allowed to cool and harden.

The above-mentioned and other features of this invention and the manner of obtaining them will become more apparent, and the invention itself will be best understood by reference to the following description of an embodiment of the invention taken in conjunction with the accompanying drawings.

DETAILED DESCRIPTION OF THE INVENTION

Figure 1:
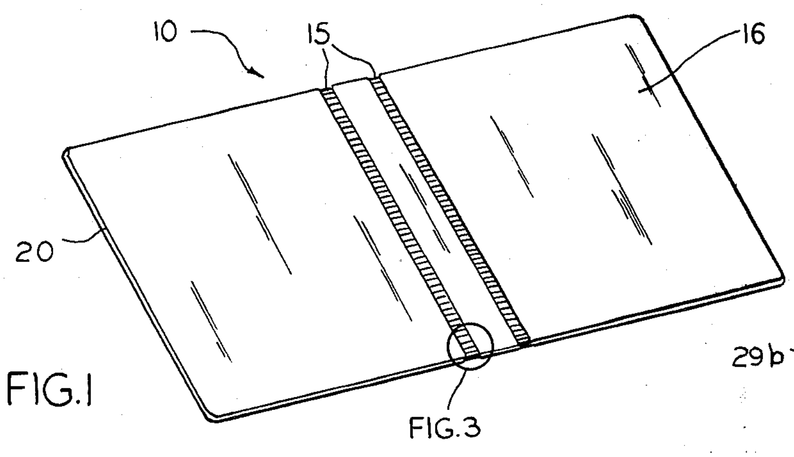
FIG. 1 is a perspective view of a binder cover which is spread flat and made in accordance with the invention.
Figure 2:
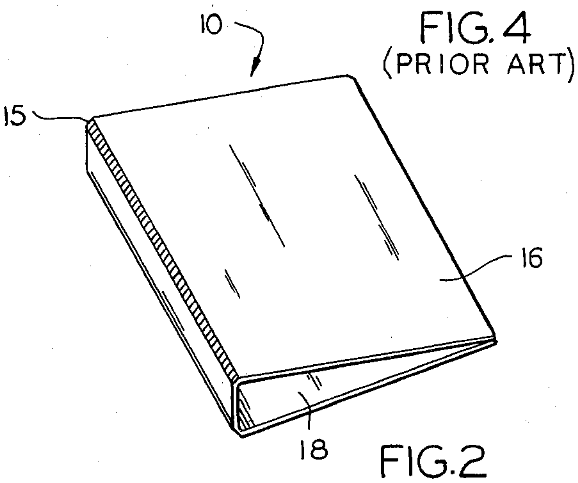
FIG. 2 is a perspective view of a binder cover which is folded along the hinges and made in accordance with the invention.
Figure 9:
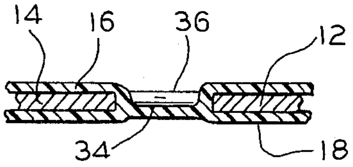
FIG. 9 is a cross-sectional view of the hinge of the inventive binder cover taken along line 8—8 in FIG. 3.

Binder covers 10 similar to those shown in FIGS. 1 and 2 can be produced in a variety of ways. One common method involves high-frequency heat sealing, as generally described in 1975–1976 *Modern Plastics Encyclopedia* in an article beginning on page 414 by Kenneth Arutt entitled "High-Frequency Heat-Sealing/Embossing." Three flat inserts of rigid cardboard, two of which are shown in FIG. 9 as 12 and 14, are placed between two sheets 16 and 18 of flexible thermoplastic. Polyvinyl chloride is often the preferred thermoplastic. The sandwich of thermoplastic and cardboard is placed between the top plate and bottom or bedplate of a heat sealing press (not shown) which is usually pneumatically operated. A number of welding dies or electrodes, often fashioned from brass strips, are arranged on the top plate to outline the desired shape of the binder cover. An R.F. generator supplies high frequency electric current of approximately 27.12 mHz to the electrodes. The current melts that portion of the thermoplastic in contact with the electrode and, in combination with the press, a seal is produced between the two thermoplastic sheets forming the outside edge 20 of a binder cover. The excess thermoplastic can then be trimmed away.

Figure 8:
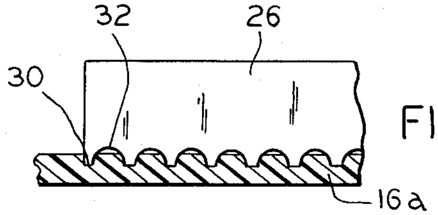
FIG. 8 is a cross-sectional view of the welding die of FIG. 6 embedded into a sheet of vinyl.

To produce hinges 15 for the cover 10, an additional pair of electrodes are affixed to the top plate of the press so as to weld the sheets 16 and 18 together between the inserts, as best shown in FIG. 8. This occurs simultaneously with sealing the outside edge 20 of the binder.

Figure 5:
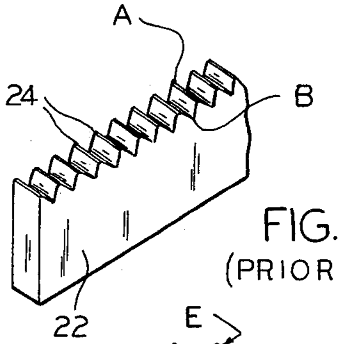
FIG.5 (PRIOR ART)
FIG. 5 is a perspective view of a portion of a welding die used to produce the hinge of FIG. 4.

As earlier described, welding dies previously used consisted of a brass rule or strip with a flat, squared-off longitudinal surface or, as shown in FIG. 5, a brass strip 22 with a lightly etched longitudinal surface 24. The vertical height of the etchings from peak (point A) to valley (point B) is substantially less than one millimeter, and there are approximately nine peaks per centimeter of the etched surface of die 22. These peaks are slightly squared-off.

Figure 6:
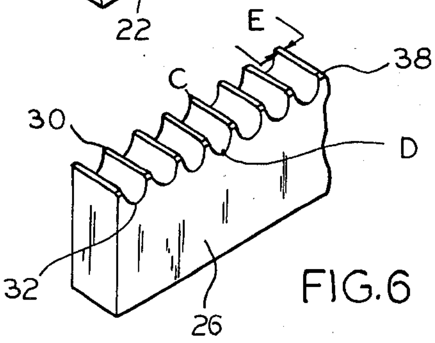
FIG. 6 is a perspective view of a portion of a welding die constructed in accordance with the invention.

In contrast, the present invention employs a metal strip 26, as shown in FIG. 6, also preferably brass, with an embossed surface. In the preferred embdiment, the embossed surface consists of alternating teeth 30 and U-shaped depressions 32. However, the embossment may be of various patterns, provided that the pattern does not include a continuous line extending the entire length of strip 26. The vertical height between point C on top of a tooth 30 and point D at the bottom of depression 32 may range between one and two millimeters. As described subsequently, this length will vary according to the thickness of the thermoplastic sheets 16 and 18 to be used and generally, although not necessarily, will be greater than the combined thicknesses of vinyl sheets 16 and 18. There are approximately five teeth per centimeter of strip 26, with approximately one millimeter measured horizontally between the teeth 30. The teeth have a flat squared-off top having a thickness E of approximately 0.5 millimeters. For a loose-leaf binder cover suitable for 8½ by 11 inch paper, the preferred strip 26 is approximately 4.5 millimeters in thickness and approximately 29.5 millimeters in a length, but again, these dimensions are not critical to the invention and will vary with the desired application.

Figure 4:
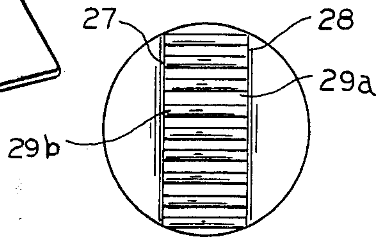
FIG.4 (PRIOR ART)
FIG. 4 is an enlarged view of a portion of a hinge found in some prior art binder covers.
Figure 7:
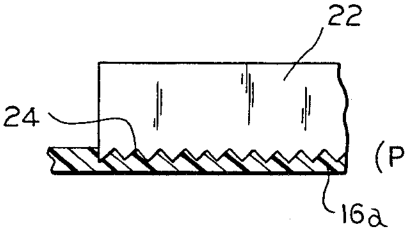
FIG.7 (PRIOR ART)
FIG. 7 is a cross-sectional view of the welding die of FIG. 5 embedded into a sheet of vinyl.

As shown in FIG. 7, the prior art welding die 22 would be embedded in the top surface 16*a* of the top vinyl sheet 16 to the full height of the etchings 24. This fact, coupled with the relatively short height of the etchings and the large number of etchings per centimeter of die 22, produces two substantially continuous vertical boundaries or lines 27 and 28 welded into the vinyl for each hinge extending from top to bottom of the binder covers, as shown in FIG. 4. The entire hinge area is welded inasmuch as the indentations 29*a* in the vinyl produced by the peaks of the etchings are connected by welded ridges 29*b* produced by the valleys of the etchings. In addition, substantial vinyl is removed from the hinge area since the width of each of the indentations is substantially equal to the width of each ridge. The resulting hinge is substantially similar to the other prior art hinge earlier discussed which is produced by a die having a continuously flat, squared-off surface.

Figure 3:
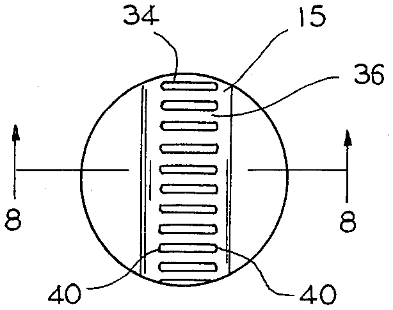
FIG. 3 is an enlarged view of the portion of FIG. 1 showing the hinge of a binder cover made in accordance with the invention.

In contrast, the welding die 26 of the present invention is not embedded to the full length of the teeth 30, as shown in FIG. 8. This procedure produces hinge 15 as best shown in FIG. 3 having a plurality of separate horizontal indentations 34 in the top surface 16*a* of the vinyl, which are not connected by vertical indentations in the vinyl extending from top to bottom of the binder cover 10. With the embodiment of die 26 shown in FIG. 6, the resulting indentations are shaped like horizontally oriented grooves in the thermoplastic and have dimensions which correspond to teeth 30. The indentations are separated by regions 36 of approximately one millimeter in width of non-welded vinyl which are raised relative to the grooves 34, as best shown in FIG. 9. The indentations 34 are each more narrow in width than each of the raised regions and, in the described embodiment, are approximately one-half the width of the raised regions. With the embodiment of die 26 shown in FIG. 6, the indentations and raised regions are, in their longest dimension, transverse to a longitudinally oriented hinge; however, as described earlier, the pattern of indentations and raised regions may be produced by embossments of various patterns in which the individual indentations and raised regions are not necessarily transverse to the hinge orientation.

Desirably, teeth 30 of die 26 have slightly chamfered edges 38, which in turn produces indentations 34 having two slightly beveled edges 40. The chamfered edge 38 provides a smoother release of the molten vinyl from the teeth 30 and avoids piercing the vinyl sheets 16 and 18 with the teeth.

The many advantages of this invention are apparent. Less vinyl is welded and less plasticizer is removed from the hinge area, thereby producing a thicker and stronger hinge. Without vertically oriented lines or boundaries in the vinyl, the inventive hinge is considerably more resistant to the vertically directed stresses which are predominant in the hinge area during normal use. In addition, the method of producing this improved hinge is compatible with existing equipment. Of course, there are still other advantages which will be apparent to those skilled in the art.

The hinge described herein and the method of producing it is generally suitable not only for loose-leaf binder covers, but also for other vinyl devices having hinged or folded portions, such as folders, checkbook covers, toys, advertising specialty and stationary items, furniture, pads of all types, handbags, and wallets. Thus, while the principles of the invention have been described above in connection with specific apparatus and applications, it is to be understood that this description is made only by way of example and not as a limitation on the scope of the invention.

We claim:

1. In combination with a loose-leaf binder cover of the type wherein a plurality of flat rigid inserts are sandwiched between a sealed pair of thermoplastic sheets including a first upper and a second lower sheet, wherein a hinge is to be formed in the thermoplastic sheets between the flat inserts, the improvement comprising: a plurality of alternating indentations and regions raised relative thereto in the first upper sheet extending longitudinally from the top to the bottom of the first sheet and between said inserts to form a hinge, the longest dimension of said indentations extending transversely to a longitudinally oriented hinge, said raised regions being wider in the longitudinal direction than said indentations and coplanar with said first upper sheet across the hinge, wherein said hinge resists longitudinal tearing by maintaining the full thickness of the thermoplastic sheets for virtually the entire length of the hinge.

2. The article of claim 8 wherein said indentations have beveled edges at the ends of the indentations.

* * * * *

UNITED STATES PATENT AND TRADEMARK OFFICE

CERTIFICATE OF CORRECTION

PATENT NO. : 4,397,904

DATED : August 9, 1983

INVENTOR(S) : Loren J. Hulber and Raymond W. Fluckiger

It is certified that error appears in the above—identified patent and that said Letters Patent is hereby corrected as shown below:

Column 1, Line 9, "home" should be --homes--

Column 4, Line 32, "stationary" should be --stationery--

Column 4, Line 58, "claim 8" should be --claim 1--

Signed and Sealed this

*Fourth* Day of *October 1983*

[SEAL]

*Attest:*

GERALD J. MOSSINGHOFF

*Attesting Officer* *Commissioner of Patents and Trademarks*